UNITED STATES PATENT OFFICE.

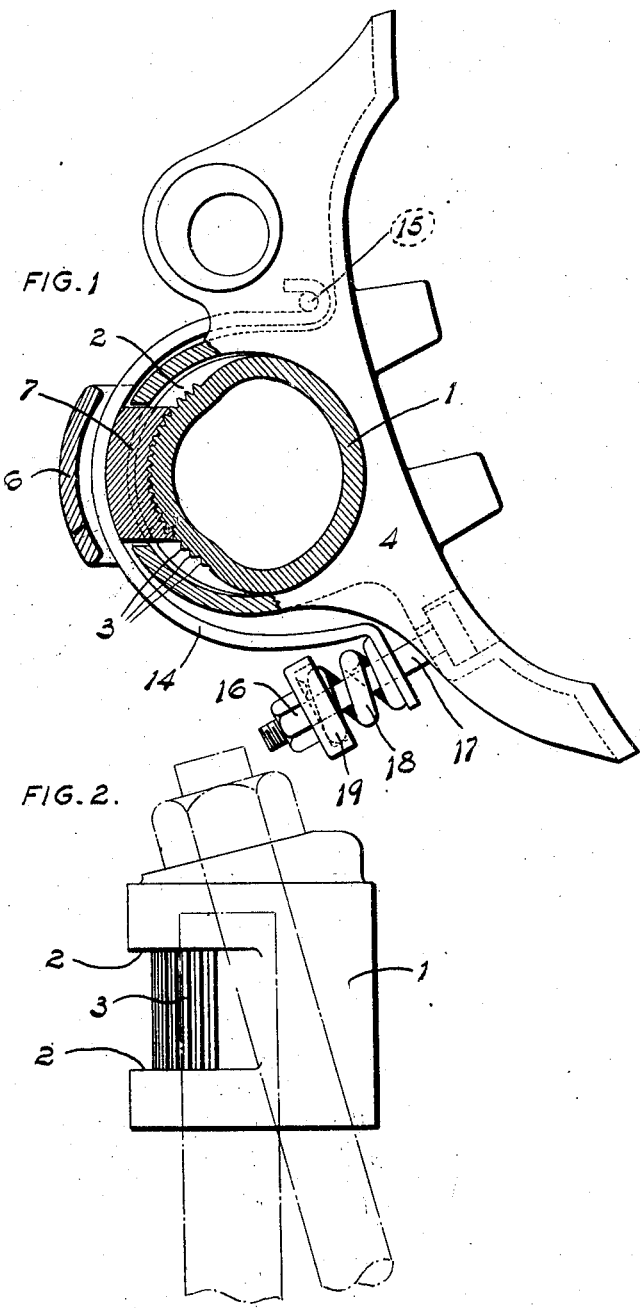

EDWARD L. WHITE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

1,022,806.      Specification of Letters Patent.      Patented Apr. 9, 1912.

Original application filed July 6, 1909, Serial No. 506,048. Divided and this application filed June 27, 1910. Serial No. 569,111.

*To all whom it may concern:*

Be it known that I, EDWARD L. WHITE, a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is an end elevational view, partly in section, of my improved adjustable brake head. Fig. 2 is a detail view of the thrust block or part of the brake beam on which the head is mounted.

This invention relates to adjustable brake heads and is a division of an application filed by me July 6, 1909, Serial Number 506,048.

The object of my invention is to generally improve the construction of automatically adjustable brake heads and to provide simple and inexpensive means whereby the brake heads are arranged upon the ends of the beam in such manner that they will automatically adjust themselves to the peripheries of the car wheels when the brakes are set, regardless of the character or position of the brake hangings.

Referring to the accompanying drawings, 1 designates the thrust block or sleeve of a trussed brake beam, but it is obvious that my improved brake head can be mounted upon the end of a solid beam formed to receive it.

2 is a segmental groove in the thrust block which is preferably provided with a series of teeth or serrations 3.

4 designates the brake head which is provided with a circular opening or socket to receive the sleeve or thrust block 1. The rear wall of this socket is slotted or formed with an opening which is preferably protected by a vertically disposed housing 6, but this housing is not necessary or essential to my invention.

7 is a friction block arranged in the opening in the brake head and coöperating with the part of the beam on which said head is mounted, said friction block extending into the groove as shown in Fig. 1 so that when the brake head is in the position shown the friction block locks it against longitudinal movement of the head, but permits automatic rotary adjustment of said head on the beam.

14 indicates a flat or leaf spring substantially semi-circular in form, the ends thereof being bent outwardly, one of said ends engaging the brake head by means of a pin or rivet 15, while the opposite end is provided with an opening through which passes a bolt 17 upon which is threaded a nut 16. An expansive coil spring 18 is preferably located on the bolt 17 between the end of the spring 14 and a washer or spring follower 19 arranged under the nut 16. This construction permits the head 4 to automatically adjust itself on the end of the beam when the brakes are applied. If desired, after the head adjusts itself, the nut may be turned down so as to firmly hold the head in position and necessitate considerable power to move the head on the beam. For purposes of automatic adjustment, the leaf spring 14 and the coil spring 18 should be only tensioned sufficiently to hold the brake head in position against movement by gravity or from shocks and jars.

Instead of having the friction block 7 separate, it is obvious that it could be riveted in position to the spring 14 and, indeed, for that matter, the friction block could be formed as an integral part of said spring or dispensed with entirely, in which event the spring would directly engage the part of the brake beam on which it is mounted.

What I claim is:

1. In a brake beam, the combination with a brake head, a leaf spring arranged externally the head and whose ends are retained by the head, and means coöperating with said spring whereby the head is held in place and is capable of automatic adjustment.

2. A device of the character described comprising a brake head, a brake beam carrying the head, and a leaf spring coöperating with the beam, the ends of said spring being turned outwardly and engaging portions of the head.

3. A device of the character described comprising a brake head, a brake beam carrying the head and having a circumferential groove, and an exteriorly-arranged leaf spring embracing a portion of said head, the ends of said leaf spring being attached to said head, whereby the head is held in place on the beam and is capable of automatic adjustment therearound.

4. A device of the character described comprising a brake head, a brake beam carrying the head and having a circumferential groove, and an exteriorly-arranged leaf spring embracing a portion of said head, the ends of said leaf spring being attached to said head and the middle portion thereof passing through an opening in the head, whereby the head is held in place on the beam and is capable of automatic adjustment therearound, and the said groove being only on one side of said beam whereby when the brake head is turned a portion of a revolution to displace said groove, with respect to its coöperating part, said head may be removed from the beam.

5. A device of the character described comprising a brake head and a curved leaf spring arranged externally of the head and sprung around the beam for holding the head in adjusted position, the said spring having its ends retained by the head.

6. A device of the character described comprising a brake head, a brake beam carrying the head and having a transverse recess therein, and a curved leaf spring sprung around the said beam and coöperating therewith in said recess and having its ends retained by the said head.

7. A device of the character described comprising a brake head having an opening therethrough, a brake beam extending through the opening in said head and having a transverse recess therein, and a leaf spring sprung over the beam in the said recess and having its ends retained by the said head, said recess coming flush with the outer surface of the beam on at least one side thereof whereby the bearing surface between the beam and the head is increased.

8. A device of the character set forth comprising a brake head, a brake beam carrying the head, a spring member arranged externally of the head and sprung over the beam for maintaining adjustment between the beam and the head, the said spring having its end portions retained by the head, and a block interposed between the spring and the part of the beam on which the head is mounted.

9. In combination, a brake beam, a brake head, and a leaf spring, the latter having its ends secured in position on the head and having its middle portion passing through an opening in the head and coöperating with friction means whereby the adjustment of the head on the beam is maintained.

10. A device of the character set forth comprising a brake head, a brake beam carrying the head, and a spring member sprung over the beam having its ends turned outwardly and retained by the head.

11. A device of the character described comprising a brake head, a brake beam carrying the head, and a curved leaf spring sprung around the beam and gripping the latter, the said spring having its ends detained by the head, for purposes substantially as described.

12. A device of the character described comprising a brake head, a brake beam carrying the said head and having a transverse recess therein, and a curved leaf spring sprung around the said beam in the said recess and having its ends detained by the said head, for purposes substantially as described.

13. A device of the character described comprising a brake head having an opening therethrough, a brake beam extending through the opening in the said head and having transverse recesses therein, and a leaf spring sprung over the beam in the said recesses and having its ends detained by the said head, the said recesses coming flush with the outer surface of the beam on at least one side thereof whereby the bearing surface between the beam and the head is increased, substantially as set forth.

14. A device of the character set forth comprising a brake head, a brake beam carrying the head, and a spring member sprung over the beam and gripping the latter, the said spring member having its end portions detained by the head, substantially as set forth.

15. A device of the character set forth comprising a brake head, a brake beam carrying the head, and a spring member sprung over the beam and having its ends turned outwardly and detained by the head, substantially as set forth.

In testimony whereof I hereunto affix my signature in the presence of two witnesses, this 21st day of June, 1910.

EDWARD L. WHITE.

Witnesses:
  E. T. WALKER,
  M. F. HUNTOON.